United States Patent [19]

Ozaki

[11] 4,226,310
[45] Oct. 7, 1980

[54] BICYCLE FREE WHEEL HUB WITH COASTER BRAKE

[75] Inventor: Nobuo Ozaki, Osaka, Japan

[73] Assignee: Maeda Industries, Ltd., Osaka, Japan

[21] Appl. No.: 969,271

[22] Filed: Dec. 14, 1978

[30] Foreign Application Priority Data

Dec. 16, 1977 [JP] Japan .................................. 52-152074
Mar. 27, 1978 [JP] Japan .................................. 53-35124

[51] Int. Cl.³ ........................ B62L 5/02; F16D 41/28
[52] U.S. Cl. ..................................... 192/6 R; 188/26
[58] Field of Search ...................... 192/6 R, 5; 188/26

[56] References Cited
U.S. PATENT DOCUMENTS

| | | | |
|---|---|---|---|
| 2,410,785 | 11/1946 | Hood | 192/6 R |
| 2,552,484 | 5/1951 | Hood | 192/6 R |
| 2,649,942 | 8/1953 | Hood | 192/6 R |
| 2,903,107 | 9/1959 | Gleasman | 192/6 R |
| 3,170,549 | 2/1965 | Baker III | 192/6 R |
| 3,252,551 | 5/1966 | Hood | 192/6 R |
| 3,254,744 | 6/1966 | Kimpflinger | 192/6 R |

FOREIGN PATENT DOCUMENTS 50-8237 1/1975 Japan ..................................... 74/217 B

*Primary Examiner*—C. J. Husar
*Assistant Examiner*—Conrad Berman
*Attorney, Agent, or Firm*—Birch, Stewart, Kolasch & Birch

[57] ABSTRACT

A bicycle free wheel hub with coaster brake adapted to be actuated by back-pedalling, comprising a clutch cone which has a clutch surface at its outward end and a brake-shoe expanding surface at its inward end, and is provided with an axial hole having an internal non-smooth surface, a plurality of slits which are formed in an inward portion of an anchor member fixedly mounted on a stationary axle, and a plurality of detent pieces which are respectively disposed within the slits for restricting a plurality of brake shoes from circumferential motion and are arranged so that they are elastically urged radially by a spring member for frictionally engaging each one end of the detent pieces with the non-smooth surface of the clutch cone.

12 Claims, 9 Drawing Figures

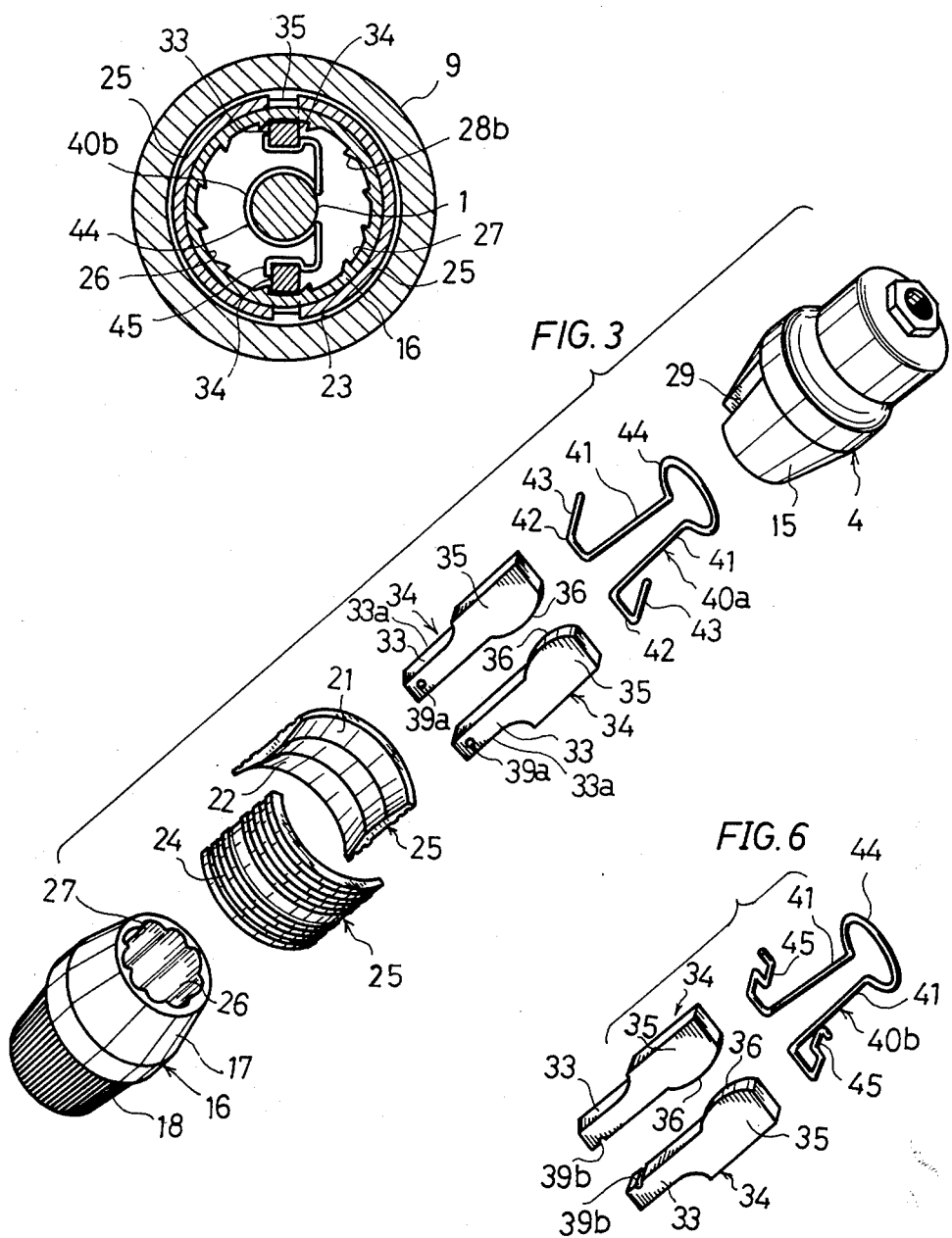

BICYCLE FREE WHEEL HUB WITH COASTER BRAKE

BACKGROUND AND SUMMARY OF THE INVENTION

This invention relates to a bicycle free wheel hub with a coaster brake adapted to be actuated by back-pedalling.

There have been proposed various models of the coaster hubs, among which the most relevant prior arts to the present invention are disclosed in specifications of U.S. Pat. No. 3,252,551 and Japanese Patent Application Laying-Open No. 50-8,237.

As illustrated in FIGS. 7 and 8 of the accompanying drawings, the first model of the prior art device proposed in said U.S. patent comprises a fixed axle a, a driving member b journalled thereon, an anchor member c non-rotatably mounted on the axle a, hub shell g journalled on the driving member b and anchor member c and having an interior cylindrical braking surface d and an interior frusto-conical clutch surface e engageable with a corresponding clutch surface e' of a clutch nut h, said driving member b having a threaded portion f extending into the interior of the hub shell g, the clutch nut h being threaded on the driving member b for traversal into and out of engagement with the interior clutch surface e of the hub shell, and an expander member j loosely located in the hub shell g between the clutch nut h and anchor member c, said expander and anchor members having frusto-conical sleeve portions i, k extending toward each other, a pair of substantially semicylindrical brake shoes 1 resting at their ends on the conical portions i, k of the expander and anchor members j, c, said expander and anchor members having diametrically located projections n, n' extending radially from the conical portions i, k thereof and located between the brake shoes 1 to thereby prevent rotation of the brake shoes and of the expander member, said clutch nut h and expander member j having clutching teeth o, o' adapted to prevent relative rotation when engaged, a detent sleeve m frictionally engaging the clutch nut h and expander member j to insure traversal of the clutch nut h responsive to rotation of the driving member b, and said projections n, n' from the expander and anchor members j, c having substantially radial side surfaces which remain in contact with the surfaces of the members j, c from which they have been partially severed to thereby support the projections against torsional stress.

According to this first model, however, the expander member j and the clutch nut h must be provided as separate pieces in addition to the fact that it is necessary to provide the detent sleeve m having such a configuration, substantially as illustrated in FIG. 8, resulting in such a disadvantage that the high manufacturing cost cannot be avoided because of relatively large number of parts requiring complicated manufacturing processes. A further disadvantage is that, since the detent sleeve m is adapted to embrace and bear with a strong friction on the cylindrical surfaces of the expander member j and the clutch nut h, undesirable frictional heat is developed therebetween to a considerable degree when the driving member b is rotated in the forward direction. A still further disadvantage is that, when the driving member b is rotated in the back-pedalling direction, there occurs an undesirable slip between the expander member j and the detent sleeve m, hindering a quick braking function.

In order to overcome some of the disadvantages inherent in the afore-said first model, an improved type, that is, the second model as illustrated in FIG. 9, is proposed in said laid-open Japanese patent application, wherein the expander member j and clutch nut h in said U.S. patent are combined into a single piece of clutch cone q, and the sleeve m in said U.S. patent is replaced with a left-handed coil spring p, being characterized in that the coil spring p, which has an external diameter equal to or slightly smaller than the internal diameter of the clutch cone q, is fixed at one end to a fixed brake cone c' (corresponding to said anchor member c) and partially received at a position r within the clutch cone q having right-handed threads formed internally thereof and screwed on a cylindrical extension of a driving member b', so that, when the driving member b' is rotated in the back-pedalling direction, said coil spring p is forcibly expanded in diameter to impart such a great frictional resistance to the internal surface of the clutch cone q as to permit integration of the two elements p, q, causing thereby relative rotation of the driving member b' with respect to the clutch cone q, and as a result, the cone q is moved axially by threads in the leftward direction of FIG. 9 to come into frictional engagement at opposed tapered surfaces s with the brake shoes 1.

Although this second model of the conventional device can be manufactured at a lower cost as compared with the aforementioned first model, it is still disadvantageous in that an undesirable slip occurs between the clutch cone q and the coil spring p and that a certain time is required until the coil spring p has been deformed enough, hindering a quick braking effect. A further disadvantage is that it cannot be dispensable to provide a certain detent means (not disclosed) performing the same function as said projections n, n' of the foregoing first model in order to prevent the relative rotation between the brake shoes 1 and the brake cone c', resulting in that an increased cost working process for forming said detent means is required. A still further disasdvantage is that repeated expansions and torsions of the coil spring p easily invite fatigue thereof and deterioration in performance. In other words, this second model is inferior in durability.

It is an object of the present invention to eliminate the above-discussed disadvantages inherent in conventional devices.

Another object is to provide an improved bicycle free wheel hub with coaster brake which is simpler in construction and smaller in number of parts, thereby permitting a lower manufacturing cost.

A further object is to provide an improved bicycle free wheel hub with coaster brake which facilitates quick and accurate braking effect.

A still further object is to provide an improved bicycle free wheel hub with coaster brake which can enjoy a long span of life without deterioration in performance.

According to the present invention, there is provided a free wheel hub with coaster brake comprising an anchor member having a pair of axial slits formed in diametrically opposite sections thereof, a pair of detent pieces which are formed separate from the anchor member so as to be received within said slits of the anchor member, each of said detent pieces being provided with a contact surface which frictionally prevents the rotational movement of the brake shoes, each of the detent pieces being further provided with a reduced extension which is engageable with an internal non-smooth contact surface of a clutch cone, and a spring member adapted to urge the reduced extensions of the detent pieces against the internal non-smooth contact surface of the clutch cone. The non-smooth contact surface may be formed in various ways as will be hereinafter described in detail with reference to the accompanying drawings.

BRIEF DESCRIPTION OF THE DRAWINGS

The present invention will become more fully understood from the detailed description given hereinbelow and the accompanying drawings which are given by way of illustration only, and thus are not limitative of the present invention and wherein:

FIG. 3 is an exploded perspective view showing the essential elements of the invention;

FIG. 5 is also a similar view to FIG. 2, showing another modification in which arrangement of the spring member and the detent pieces are slightly modified as well as the configuration of the internal contact surface of the clutch cone is modified;

FIG. 6 is a perspective view showing the spring member and detent pieces shown in FIG. 5;

DESCRIPTION OF THE PREFERRED EMBODIMENTS

Figure 1:
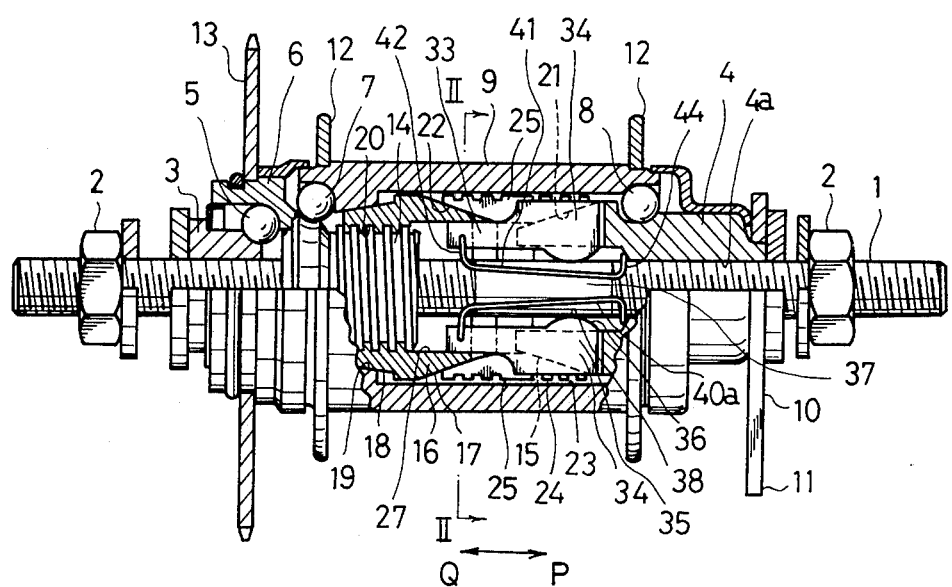
FIG. 1 is a front side elevation, partly broken away and partly in section, of a preferred embodiment according to the present invention.
Figure 2:
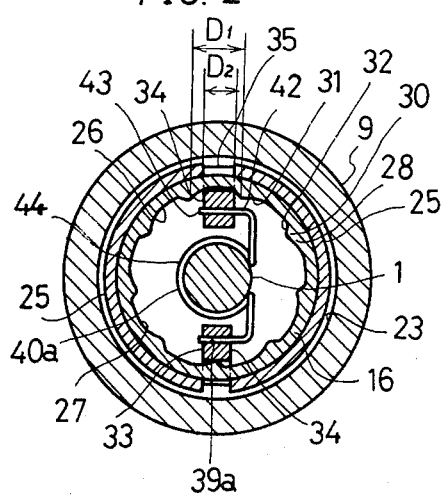
FIG. 2 is a cross section taken along the lines II—II of FIG. 1.

Referring now by reference numerals to the drawings, in particular to FIGS. 1 to 3 showing the first embodiment of the present invention, there is illustrated a stationary axle 1 which is threaded at the ends and secured to a bicycle frame (not shown) by clamping nuts 2, conventionally. A bearing cone 3 is adjustably mounted on one threaded end section of the axle 1, while an anchor member 4 is likewise threaded on the other end section thereof, said member 4 also serving as a bearing cone. Ball bearings 5 are interposed between the bearing cone 3 and a driving member 6, so that the latter is journalled on the former. A cylindrical hub shell 9 with a pair of known spoke flanges 12 is journalled at one end on ball bearings 7 supported by a bearing race of the driving member 6 and at the other end on ball bearings 8 supported by a bearing race of the anchor member 4. Rotation of the anchor member is prevented by a brake arm 10 which is fixed at one end to the anchor member 4 and at the other end 11 to a bicycle frame (not shown), conventionally.

The driving member 6 has a known sprocket 13 fixedly mounted thereon so as to be driven by a known drive chain (not shown), and is internally formed with a reduced cylindrical extension 14 which is externally threaded, preferably with a large pitch, and extends into the interior of the hub shell 9, so that the member 6 with the extension 14 is rotated alternatively in forward or reverse direction in accordance with directions of pedalling.

The anchor member 4, which has an axial hole 4a through which the axle 1 passes, is formed with a frusto-conical portion 15 having its reduced end directed to the interior of the hub shell 9. The outer periphery of the portion 15 is smooth so as to serve as a brake-shoe expander surface which is contactable with the internal surface of a pair of known brake shoes 25. A pair of slits 29 are formed in the portion 15 to be hereinafter described.

A clutch cone 16 with internally threaded hole 20 at its outward end section is screwed on the extension 14 of the driving member within the hub shell 9. The cone 16 is formed at its inner end with a frusto-conical portion 17 which is similar in external configuration to that of said portion 15 but has its reduced end directed oppositely. The external periphery of the portion 17 is smooth so as to serve as a brake-shoe expander surface which cooperates with the external surface of said portion 15. The clutch cone 16 is formed at its outer end with a tapered clutch surface 18 frictionally engageable with a mating clutch surface 19 formed internally of the hub shell 9.

A pair of brake shoes 25 are provided, each of which is formed externally with a cylindrical brake surface 24 of suitable frictional character and internally with conically flared smooth surfaces 21, 22 at opposite ends thereof. Each of the brake shoes 25 is disposed within the hub shell 9, so that said brake surface 24 is frictionally engageable, when actuated, with the internal surface 23 opposed thereto, and so that said conical surface 21 is in contact with the smooth surface 15 of the anchor member 4 and the other conical surface 22 is in contact with the smooth surface 17 of the clutch cone 16.

The clutch cone 16 is so arranged as to move axially outward (direction of arrow Q in FIG. 1) by means of threads when the driving member 6 is rotated in the forward direction (bicycle running direction), so that its clutch surface 18 comes into frictional engagement with the internal surface 19 of the hub shell for co-rotation together, and also so arranged as to move axially inward (direction of arrow P) by means of threads when the member 6 is rotated in the reverse direction (back-pedalling direction), so that its surface 17 comes into contact with the surfaces 22 of the brake shoes 25 in order to force the brake shoes to radially expand into frictional engagement with the internal surface 23 of the hub shell 9 for braking performance.

The construction as described in the foregoing is substantially common in many points with the conventional devices, it should be understood, however, that the important features of the present invention consist in the following constructions.

The clutch cone 16 is formed with an axial center hole 26 at its inward end section, said hole 26 being adjacent to said threaded hole 20 in communication with each other. The axial hole 26 is provided with a non-smooth internal surface 27. In the first embodiment, as best shown in FIG. 2, the surface 27 is of such a substantially corrugated surface having a plurality of spaced rising portions 28 extending axially in parallel with one another. Each of the rising portions 28 may preferably be so shaped as to include a top 30, a gentle slope 31 at one side thereof, and a steep slope 32 at the other side, so that frictional resistance with said reduced extension 33 of each detent piece 34 (to be hereinafter described) is smaller when the driving member 6 is rotated in the forward direction than that in the reverse direction.

Figure 4:
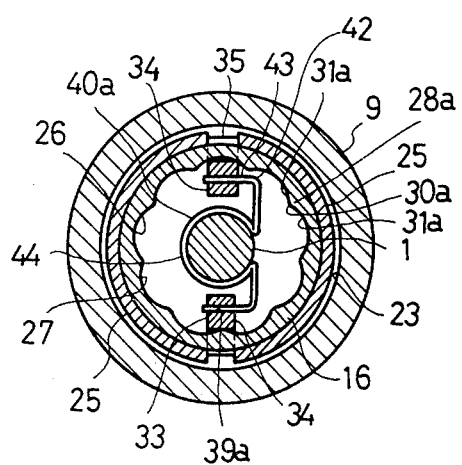
FIG. 4 is a similar view to FIG. 2, showing a modification of the invention, wherein the configuration of the internal contact surface of the clutch cone is slightly modified.
Figure 7:
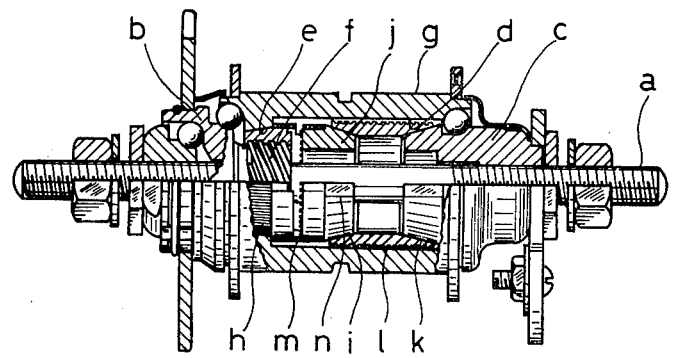
FIG. 7 is a similar view to FIG. 1, showing an example of a prior art device.
Figure 8:
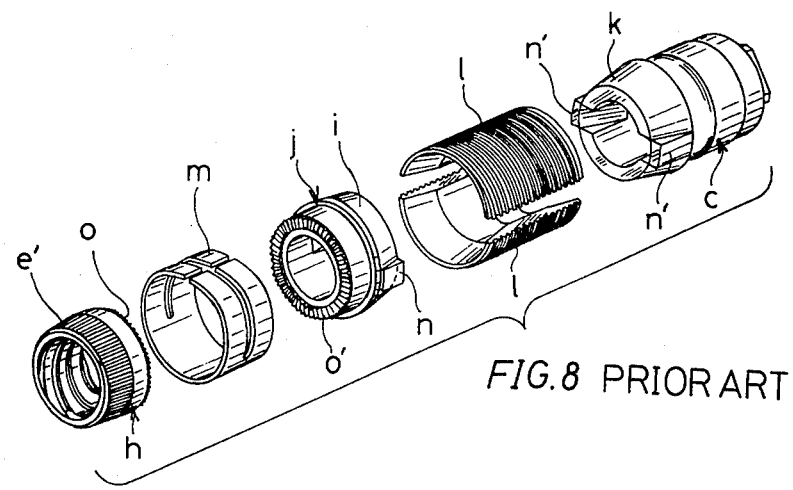
FIG. 8 is a similar view to FIG. 3, showing the essential elements of the prior art device of FIG. 7.
Figure 9:
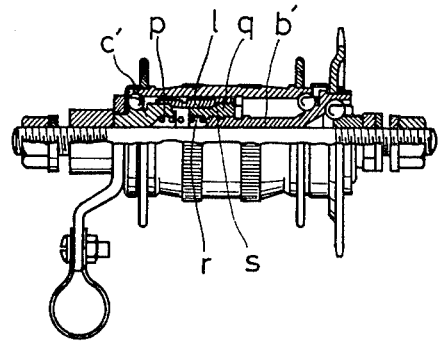
FIG. 9 is a rear side elevation, partly broken away and partly in section, of another example of a prior art device.

Said non-smooth surface may be varied in many ways. For example, as illustrated in FIG. 4, its rising portion 28a may be so shaped as to include a top 30a and a pair of substantially symmetrical slopes 31a at both sides of the top 30a. Further, the rising portions 28 or 28a may preferably be spaced with an equal interval, however, it is also possible to employ unequal intervals.

The non-smooth surface may also be of such form as having ratchet teeth 28b spaced apart at an equal interval and axially extending in parallel with one another, as illustrated in FIG. 5, so that they are engageable with the extensions 33 of the detent pieces 34 when the driving member 6 is rotated in the reverse direction.

A pair of detent pieces 34 are provided, each of which includes a base portion 35 with a rounded surface 36 formed at one end thereof and a reduced extension 33 which extends axially through spaces defined between opposed marginal edges of the brake shoes into the axial hole 26 of the clutch cone 16, said extension being provided at its free end with an engaging portion 33a which is operatively engageable with said non-smooth surface 27 of the hole 26. Each of the extension 33 may be provided with a fixing means in the form of an aperture 39a (FIGS. 1 to 4) for the purpose to be hereinafter described. The base portion 35 is slightly smaller in thickness as compared with the spatial width of the slits 29 formed diametrically in the anchor member 4 in intercommunication with the axial hole 4a thereof. The base portion 35 are received in the slits 29, respectively, so that said rounded surfaces 36 are in contact at 38 in FIG. 1 with a non-threaded section 37 of the axle 1. Thus, the detent pieces 34 are rockable in substantially radial directions about the points 38, respectively. It is apparent that the detent pieces 34 are prevented by the slits 29 from moving circumferentially of the anchor member 4.

A spring member 40a may preferably be formed by bending of a piece of steel wire so as to provide a pair of spaced linear portions 41 extending substantially axially and elastically expansible at one end in radial directions. Each of the spring members 40a is provided at each expansible end of the linear portion 41 with an engaging means in the form of a hook 42 having a linear free end portion 43, and at the other end with a circular portion 44 with an internal diameter slightly larger than the external diameter of the axle 1.

The spring member 40a is fixed by engaging said circular portion 44 with threads of the axle 1 and by inserting said linear free end portions 43 into the fixing apertures 39a, respectively. Thus, the detent pieces 34 are restricted from axial movement and the reduced ends 33 are always urged radially outwardly so that the ends 33 are pressed against the non-smooth internal surface 27 of the hole 26 of the clutch cone 16, preventing the brake shoes 25 from moving circumferentially.

It will be readily understood that the spring member and the detent pieces may be varied in various ways, and that in case the engaging means being modified, the fixing means should also be modified so as to be most effectively cooperative therewith. For example, as illustrated in FIG. 6, the spring member 40b may be provided with a modified engaging means in the form of substantially C-shaped portion 45 in place of said linear portion 43. In this case, the fixing means may preferably be in the form of narrow grooves 39b instead of said aperture 39a, as also illustrated in FIG. 6.

Further, it will be apparent to those skilled in the art that the brake shoes and the detent pieces may be three or more in number, if desired.

In operation, in particular to the first embodiment shown in FIGS. 1 to 3, when the threaded extension 14 of the driving member 6 is rotated in the reverse direction by back-pedalling, the clutch cone 16 threaded thereon is urged to rotate along therewith. In this stage, however, because the engaging force of the reduced extension 33 of the detent pieces 34 with the rising portion 28 of the non-smooth surface of the hole 26 is by far greater than the frictional resistance between the threaded extension 14 and the threaded internal surface 20 of the clutch cone 16, the cone 16 is restricted from rotation. Consequently, the clutch cone 16 is forced to advance quickly and accurately by threads in the axial direction of arrow P, with its frusto-conical surface 17 pressing strongly against the tapered surfaces 22 of the brake shoes. Simultaneously therewith, the brake shoes are radially expanded to strongly press their brake surfaces 24 against the internal surface 23 of the hub shell 9 thereby to stop the forward rotation of the hub, thus braking performance is effected.

During the operation, because the circumferential movement of the brake shoes 25 are prevented by the detent pieces 34, and because the rotational movement of the detent pieces 34 are prevented by the anchor member 4 when the clutch cone 16 is forced to advance inwardly to actuate the braking shoes, the braking of bicycle can be carried out quickly and accurately. In particular, the angular movement of the clutch cone 16 is limited to such a small value defined by ($D_1$) minus ($D_2$) in FIG. 2, that is, the difference between one pitch of the rising portions 28 and the width of the reduced extension 33 of the detent piece, therefore, the desired braking can be effected accurately and quickly without time lag.

When the driving member 6 is rotated in the forward direction by front-pedalling, the clutch cone 16 is prevented from rotating together with the threaded extension 14 of the driving member 6 by the frictional resistances existing between the corrugated internal surface 27 of the clutch cone 16 and the detent pieces 34 which are pressed against said surface 27 by the function of the spring members 40a. As a result, the clutch cone 16 is forced to retire by threads along said extension 14 in the direction of arrow Q.

As will be comprehensible, said frictional resistances include such a resistance developed when the reduced extension 33 is forced to ride across a rising portion 28. This resistance can be very small, because the total frictional resistances required for preventing the integral co-axial rotation of the clutch cone 16 with the driving member 6 may be very small since there occurs no extra resistance other than frictional resistance caused by screwing engagement of the clutch cone 16 with the threaded extension 14 of the driving member. Thus, when the pedal is rotated in the forward direction, the tapered clutch surface 18 of the cone 16 is immediately pressed against the mating clutch surface 19 of the hub shell 9 for strong frictional engagement thereby to cause integral co-axial rotation of the hub shell 9 and the clutch cone 16, resulting in that the bicycle runs forward. In this operation, because a strong driving force is transmitted to the clutch cone 16 from the driving member, and because the detent pieces 34 are rockably arranged so that their reduced ends 33 are elastically disengageable from the internal non-smooth surface 27 of the clutch cone 16, the clutch cone 16 is not prevented by the detent pieces 34 from the integral co-axial rotation with the driving member 6.

As will be easily understood from the above operational manner, it is preferable to provide such a configuration of the rising portion 28 as having a gentle slope 31 at one side and a steep slope 32 at the other side, as illustrated in FIG. 2, so that the frictional resistance between the internal surface 27 and the detent pieces 34 relatively great in back-pedalling operation, and relatively small in front-pedalling operation. By this arrangement, development of undesirable frictional heat can be minimized as well as frictional loss in front-pedalling operation can be smaller as compared with the conventional devices.

It should be noted, however, that the above-discussed advantages of the first embodiment can also be obtained to a certain degree by the modified embodiment as illustrated in FIG. 4, wherein there is provided each rising portion 28a having a pair of gentle slopes 31a at both sides of the top 30a. In this embodiment of FIG. 4, it is a matter of course that a height (distance from bottom to top 30a) of each rising portion 28a should be large enough to impart a required frictional resistance in the back-pedalling operation.

Referring to the third embodiment illustrated in FIGS. 5 and 6, when the driving member 6 is rotated in the reverse direction by back-pedalling, the clutch cone 16 is prevented from rotation because the ratchet teeth 28b quickly come into engagement with the reduced ends 33 of the detent pieces 34, resulting in that the clutch cone 16 is forced to advance axially inward by threads along said extension 14, pressing its frusto-conical surface 17 forcibly against the mating surfaces 22 of the brake shoes 25 to expand them radially for braking of a bicycle.

When the driving member is rotated in the forward direction by front-pedalling, the clutch cone 16 is forced to retire axially outward by threads thereby to press its clutch surface 18 strongly against the mating clutch surface 19 of the hub shell 9 for integral co-axial forward rotation therewith. In this operation, it will be apparent that the clutch cone 16 is permitted to freely rotate clockwise relatively with respect to the detent pieces 34 while the reduced ends 33 thereof are in contact with the internal surface of the clutch cone 16. This third embodiment is particularly advantageous in that the frictional resistance between the detent pieces 34 and the internal surface 27 of the clutch cone 16 can be minimized in the front-pedalling operation, while in the back-pedalling operation, engagement of the detent pieces 34 with the surface 27 can be insured by the ratchet teeth 28b.

When the cyclist ceases to rotate the driving member 6 while the bicycle is in forward running motion, the clutch cone 16 is forced to move slightly by threads in the direction of arrow P in FIG. 1, so that its clutch surface 18 is disengaged from the mating clutch surface 19 of the hub shell 9 by quite a slight gap, without pressing the break shoes 25 against the internal surface 23 of the hub shell 9. Thus, the hub is free to continue its forward rotation. This operational manner is conventional and common to all of the embodiments of the present invention.

The present invention being thus described, it will be obvious that same may be varied in many ways. Such variations are not to be regarded as a departure from the spirit and scope of the present invention, and all such modifications as would be obvious to one skilled in the art are intended to be included within the scope of the following claims.

I claim:

1. A bicycle free wheel hub with coaster brake comprising an anchor member fixedly mounted to one end of a stationary axle, a driving member journalled on the other end of said axle, a hub shell journalled on said anchor member and said driving member, a clutch cone screwed on an externally threaded and inwardly extending axial extension of said driving member so as to move axially inward and backward by threads along with directions of rotation of said driving member, a plurality of brake shoes arranged so as to be forcibly expanded radially when said clutch cone moves axially inward, said clutch cone having a clutch surface at its outward end and a brake-shoe expanding surface at its inward end, said clutch cone being provided with an axial hole of which inward end is formed with a non-smooth surface, and a plurality of slits formed in an inward portion of said anchor member within which a plurality of detent pieces are respectively disposed with each end extended into said axial hole, said detent pieces being arranged so as to restrict said brake shoes from circumferential motion and so as to be elastically urged radially by means of at least one spring member for frictionally engaging said each end with said non-smooth surface of said clutch cone.

2. The wheel hub with coaster brake of claim 1, wherein said non-smooth surface of said clutch cone is a substantially corrugated surface.

3. The wheel hub with coaster brake of claim 2, wherein said corrugated surface comprises a plurality of spaced rising portions extending axially in parallel with one another, each of said rising portions including a top, a gentle slope at one side of said top, and a steep slope at the other side of said top.

4. The wheel hub with coaster brake of claim 2, wherein said corrugated surface comprises a plurality of spaced rising portions extending axially in parallel with one another, each of said rising portions including a top and substantially symmetrical slopes at opposite sides thereof.

5. The wheel hub with coaster brake of claim 1, wherein said non-smooth surface of said clutch cone comprises a plurality of spaced ratchet teeth axially extending in parallel with one another, said ratchet teeth being arranged so as to be engageable with said each end of the detent pieces when said driving member is rotated in back-pedalling direction.

6. The wheel hub with coaster brake of claim 1, wherein each of said detent pieces comprises a base portion and a reduced end extending axially inward from said base portion, said base portion being partially disposed within said slit of said anchor member, and said reduced end having at least one engageable portion which is operatively engageable with said non-smooth surface of said hole.

7. The wheel hub with coaster brake of claim 6, wherein said base portion is formed with a rounded surface disposed so as to be in contact with said axle.

8. The wheel hub with coaster brake of claim 1, wherein said spring member is fixedly mounted at one end onto said axle and engaged at the other end with said detent pieces for elastically urging them substantially radially outwardly.

9. The wheel hub with coaster brake of claim 8, wherein said spring member comprises a pair of spaced linear portions extending substantially axially and elastically expansible at one end in radial directions, each of expansible ends of said linear portions being provided with a means for engaging it with one end of said detent pieces, and the other end of said linear portion being provided with a circular portion for fixing said spring member onto said axle.

10. The wheel hub with coaster brake of claim 9, wherein each of said detent pieces is provided at one end with a fixing means engageable with said engaging means of said spring member.

11. The wheel hub with coaster brake of claim 10, wherein said fixing means is in the form of an aperture formed in each of said detent pieces.

12. The wheel hub with coaster brake of claim 10, wherein said fixing means is in the form of a groove formed in each of said detent pieces.

* * * * *